United States Patent
Yamamura et al.

[11] Patent Number: 6,107,712
[45] Date of Patent: Aug. 22, 2000

[54] MOTOR ACTUATOR HAVING POSITION DETECTOR

[75] Inventors: Kengo Yamamura, Shizuoka-pref.; Toshinobu Tanno, Kosai, both of Japan

[73] Assignee: Asmo Co., Ltd., Japan

[21] Appl. No.: 09/160,477

[22] Filed: Sep. 24, 1998

[30] Foreign Application Priority Data

Sep. 24, 1997 [JP] Japan .................................. 9-258191

[51] Int. Cl.[7] .......................... H02K 11/00; H01H 19/58
[52] U.S. Cl. ..................................... 310/68 B; 200/11 DA
[58] Field of Search ....................... 310/68 B; 200/11 R, 200/11 DA, 11 TW, 292, 11 D, 6 R

[56] References Cited

U.S. PATENT DOCUMENTS

| | | | |
|---|---|---|---|
| 3,293,399 | 12/1966 | Heinrich | 200/166 |
| 4,145,585 | 3/1979 | Iwasaki | 220/11 DA |
| 4,922,063 | 5/1990 | Shimizu et al. | 200/11 R |
| 5,155,306 | 10/1992 | Iijima et al. | 200/11 DA |
| 5,418,341 | 5/1995 | Sato | 200/11 R |
| 5,693,993 | 12/1997 | Ito et al. | 310/68 B |

FOREIGN PATENT DOCUMENTS

| | | | |
|---|---|---|---|
| 0 789 227 A2 | 8/1997 | European Pat. Off. | G01D 5/25 |
| 0 793 078 A1 | 9/1997 | European Pat. Off. | G01D 5/25 |
| 8-29114 | 2/1996 | Japan . | |
| 9-229666 | 9/1997 | Japan . | |
| 9-236431 | 9/1997 | Japan . | |
| 2 312 513 | 10/1997 | United Kingdom | G01D 5/245 |
| WO 89/04566 | 5/1989 | WIPO | H03M 1/24 |

*Primary Examiner*—Nestor Ramirez
*Assistant Examiner*—Dang Dinh Le
*Attorney, Agent, or Firm*—Fish & Richardson P.C.

[57] ABSTRACT

A motor actuator has a position detector provided with a pulse plate made of resin and a sliding contact. The pulse plate has a first conductive unit and a second conductive unit. The sliding contact has an input contact and an output contact. The first conductive unit makes contact with the input contact and the second conductive unit makes contact with the output contact so that a pulse signal is obtained by rotation of the pulse plate. A plurality of slit portions are formed on the first conductive unit by exposing the resin material of the pulse plate so that grease is collected in a boundary portion of each of the slit portions due to a difference in thickness between the slit portions and a conductive portion of the first conductive unit. Therefore, even if the pulse plate continuously rotates and the first conductive unit and the input contact continuously make contact with each other, grease does not run out therebetween, thereby restricting the first conductive unit and the input contact from fusing at a high temperature. Thus, the motor actuator can maintain its original position detection performance.

9 Claims, 8 Drawing Sheets

MOTOR ACTUATOR HAVING POSITION DETECTOR

CROSS REFERENCE TO RELATED APPLICATION

This application relates to and incorporates herein by reference Japanese Patent Application No. Hei. 9-258191 filed on Sep. 24, 1997.

BACKGROUND OF THE INVENTION

1. Field of the Invention

The present invention relates to a motor actuator used for a power window device that opens and closes a vehicle door window glass or a sunroof device that opens and closes a sunroof door at the top of the vehicle.

2. Related Art

A motor is used as a driving source for a power window device that opens and closes a vehicle door window glass up and down or a sunroof device that opens and closes a sunroof door. In the power window devices, a pinching restriction function is provided to restrict accidental pinching of passenger's body and foreign articles between a window glass and a window frame, for example. Among such power window devices equipped with the pinching restriction function, some devices have a limit switch provided at a specified position in the door and determine whether or not any obstacle has been pinched by the window glass based on a signal from the limit switch and a lock current of a motor to control movement of the window glass, that is, the rotation position of the motor. Other power window devices have a Hall IC or a special commutator for detecting the number of revolution of an armature to determine whether or not any obstacle has been pinched based on a revolution number detection signal (e.g., number or width of pulse signals) to control the rotation position of the motor.

However, in those power window devices having a motor rotation position detection mechanism, cumbersome adjustment of assembling position may be required when the motor and a window regulator are assembled, and cumbersome resetting after assembling work may also be required. Further, when the pinching restriction mechanism is provided, other additional expensive parts such as a control device may be required, but the accuracy is not improved so much.

In view of the foregoing problems, JP-A-8-29114 and JP-A-9-236431 disclose a position detector of a motor actuator for a moving body. The position detector for the moving body includes: a planetary gear train unit having a ring gear which is rotatably supported in a cover plate and planetary gears engaged with the ring gear; a switch portion having a moving contact plate which is formed integrally with the ring gear to rotate with the ring gear and a fixed contact terminal which is fixed on the cover plate to contact the moving contact plate; and a clutch mechanism which can shut off the transmission of the rotation force in the forward direction from the moving body (i.e., output shaft of motor) to the ring gear. Thus, when the position detector is applied to the power window device or the sunroof device, the position of the window glass or the sunroof door can be accurately detected to control the movement thereof. Further, the position detector can be readily set to the initial position without cumbersome positional adjustment, and these effects can be realized by a simple mechanism and in low cost.

Further, in the position detector, a pulse plate is integrally connected to a sun gear of the planetary gear train unit. As shown in FIG. 13, a pulse plate 300 is provided with a sequential pulse pattern. The pulse pattern has a ring-shaped first conductive unit 302 and a second conductive unit 304 disposed next to the first conductive unit 302, having a sequential pulse-shaped uneven surface. The pulse pattern is formed by plating metal material such as nickel on a resin plate. Further, a sliding contact 306 made of copper, for example, makes contact with the pulse plate 300. The sliding contact 306 is secured on the cover plate and has an input contact 306A which constantly makes contact with the first conductive unit 302 of the pulse plate 300 and an output contact 306B which makes contact with the second conductive unit 304 of the pulse plate 300.

When the pulse plate 300 rotates integrally with the sun gear, that is, with a moving body such as the motor output shaft, pulse signals are generated. Therefore, the generated pulse signals can be detected, and the moving position of the moving body can be linearly detected according to the detected signals. Thus, the position of the window glass can be constantly detected when the position detector is applied to the power window device.

However, in the above position detector for a moving body, grease tends to run out between the first conductive unit 302 of the pulse plate 300 and the input contact 306A of the sliding contact 306, because both the first conductive unit 302 and the input contact 306A are made of metal and constantly make contact (slide on) with each other. When this grease run-out occurs, the first conductive unit 302 and the input contact 306A may fuse at a high temperature, resulting in deterioration of position detection performance of the position detector.

SUMMARY OF THE INVENTION

It is an object of the present invention to provide a motor actuator which restricts grease from running out between a pulse plate and a sliding contact to restrict the pulse plate and the sliding contact from fusing at a high temperature, while maintaining an excellent position detection performance.

According to the present invention, a motor actuator includes a motor and a sensor which is coupled to an output shaft of the motor and is capable of generating a pulse signal so that a rotation position of the output shaft is detected. The sensor has first and second sliding contacts for generating the pulse signal and a pulse plate made of resin. The pulse plate is provided with a first conductive unit having a first conductive portion and a first non-conductive portion, and a second conductive unit having a sequential uneven surface made of a second conductive portion and a second non-conductive portion. When the output shaft is driven by the motor to rotate in a forward/backward direction, the pulse plate is coupled to the output shaft. When the pulse plate rotates, the first and second sliding contacts slide on the first and second conductive units, respectively, so that a pulse signal is generated. The first non-conductive portion is formed by exposing the resin material of the pulse plate so that the first conductive unit has a step at a boundary portion between the first conductive portion and the first non-conductive portion. Grease is collected at the step in the boundary portion of the first non-conductive portion. Therefore, when the pulse plate rotates and the first sliding contact slides on the first conductive unit, grease is sufficiently supplied therebetween. Thus, grease does not run out between the first conductive unit and the first sliding contact, resulting in that the first conductive unit and the first sliding contact do not fuse at a high temperature, and the motor actuator can maintain its original position detection performance.

Preferably, the first and second sliding contacts are installed in such a manner that the first sliding contact makes contact with the first conductive portion when the second sliding contact makes contact with the second conductive portion.

Further, the first non-conductive portion is formed to extend integrally from the second non-conductive portion of the second conductive unit and to have a different width in a sliding direction from that of the second non-conductive portion.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PREFERRED EMBODIMENTS (First Embodiment)

The present invention is applied to a power window device of a vehicle, for example.

Figure 1:
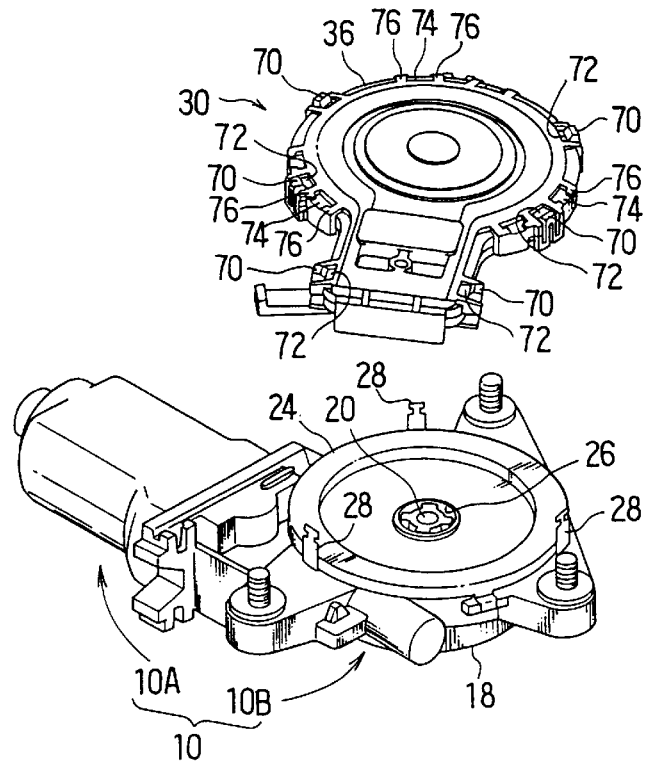
FIG. 1 is a perspective view showing a motor actuator according to a preferred first embodiment of the present invention.
Figure 2:
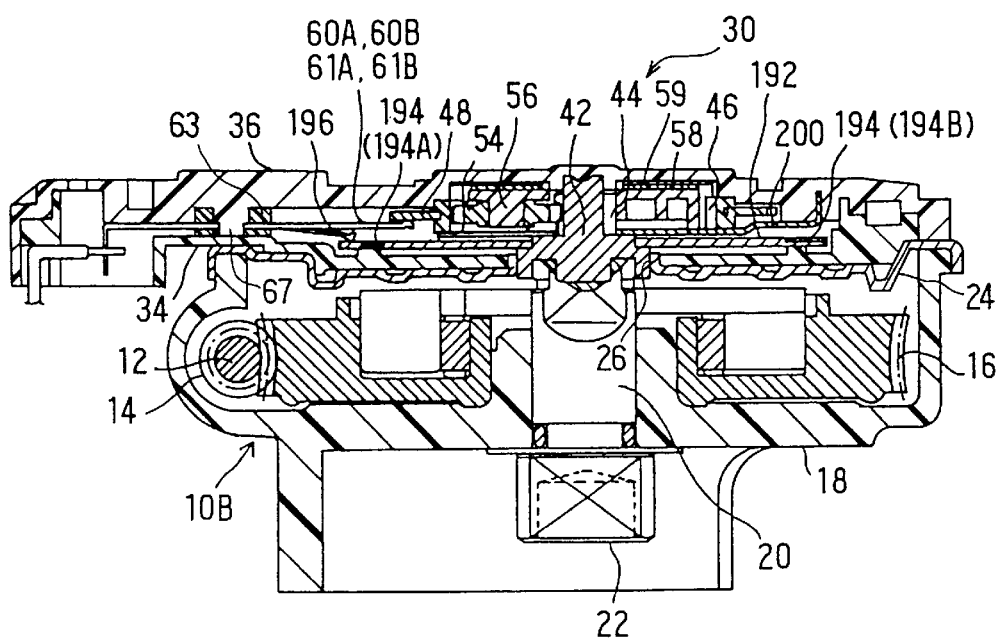
FIG. 2 is a cross-sectional view showing the motor actuator according to the first embodiment.

As shown in FIGS. 1, 2, a motor actuator 10 has a motor portion 10A, a gear portion 10B connected to the motor portion 10A, and a position detector 30. A rotation shaft 12 of the motor portion 10A extends into the gear portion 10B, and a worm gear 14 is formed at the top end of the rotation shaft 12. The worm gear 14 engages with a rotation gear wheel 16 disposed inside the gear portion 10B. In the rotation gear wheel 16, a shaft 20 as a motor output shaft is rotatably supported by a cover 18 of the gear portion 10B. Thus, when the motor portion 10A is operated and the rotation shaft 12 is rotated, the rotation force is transmitted to the rotation gear wheel 16 through the worm gear 14 so that the shaft 20 is rotated. An output fitting portion 22 is located at one end of the shaft 20, and is connected to a driving portion of a window regulator (not shown). In the first embodiment, it is set so that, when the shaft 20 or the output fitting portion 22 rotates 3 to 3.5 rotations, for example, the window glass moves 1 stroke.

On the other hand, a housing 24 is attached to the surface opposite to the output fitting portion 22 of the gear portion 10B, to be integrally connected with the cover 18. An opening 26 is formed in the center of the housing 24, and the top end of the shaft 20, which is opposite to the end provided with the output fitting portion 22, is exposed through the opening 26. Several clamping portions 28 are formed to extend from the periphery of the housing 24. In the first embodiment, the number of the clamping portions 28 is three, for example. Each of the clamping portions 28 is formed to have a T-shaped leading edge, and is used to firmly secure the position detector 30 to the housing 24. The position detector 30 is attached to the housing 24 by fastening these clamping portions 28.

Figure 3:
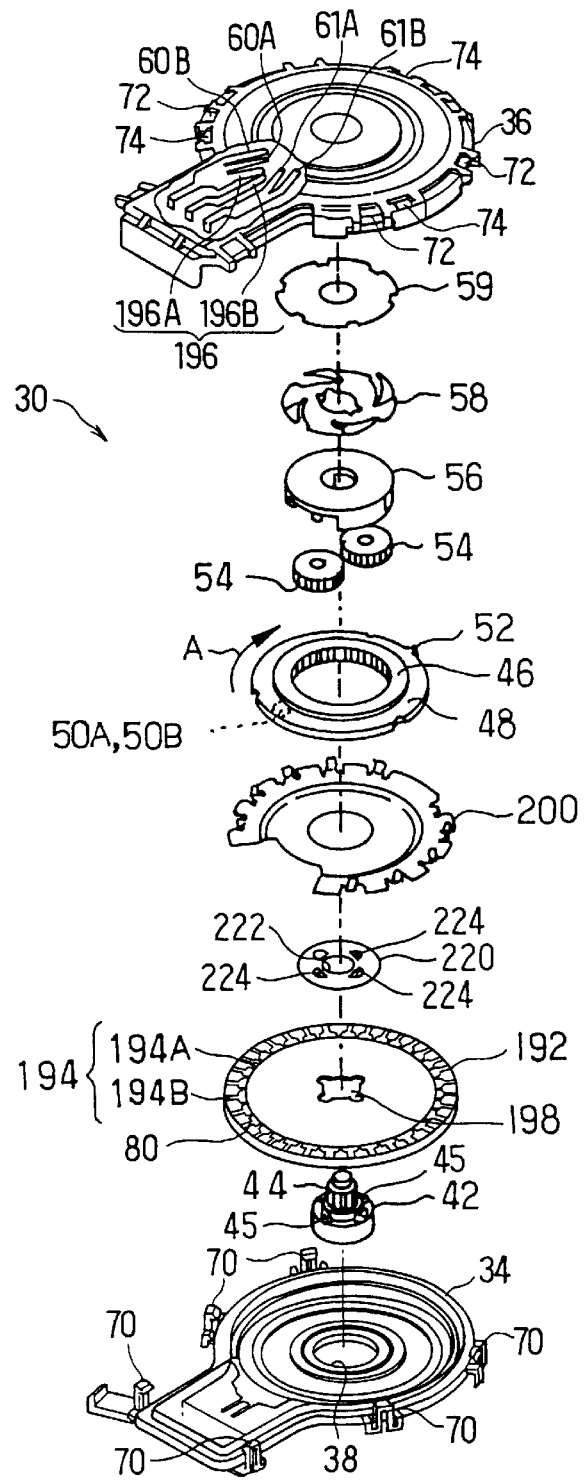
FIG. 3 is an exploded perspective view showing a position detector of the motor actuator according to the first embodiment.

As shown in FIG. 3, the position detector 30 is provided with a base plate 34 and a cover plate 36, and is formed substantially into a cylindrical shape having a thin wall by these two plates 34, 36. A through hole 38 is formed at a center portion of the base plate 34, and a protrusion 40 (FIG. 2) is formed on an inner peripheral surface of the cover plate 36 to extend in the axial direction.

Further, the position detector 30 is equipped with a connection shaft 42. One end of the connection shaft 42 is integrally connected to the shaft 20 of the rotation gear wheel 16 to constantly rotate together with the shaft 20. The other end of the connection shaft 42 protrudes into the inside of the position detector 30 through the through hole 38 formed in the base plate 34. Further, a sun gear 44 constituting a part of a planetary gear train unit is provided proximate to the other end of the connection shaft 42, and engages with planetary gears 54 which will be described afterward. Further, several protrusion portions 45 are formed on the connection shaft 42 on a periphery of the sun gear 44, to be inserted into a fitting hole 198 of a pulse plate 192 and a connection hole 224 of a washer 220, which will be described later. In the first embodiment, the number of the protrusion portions 45 is four, for example.

Figure 4:
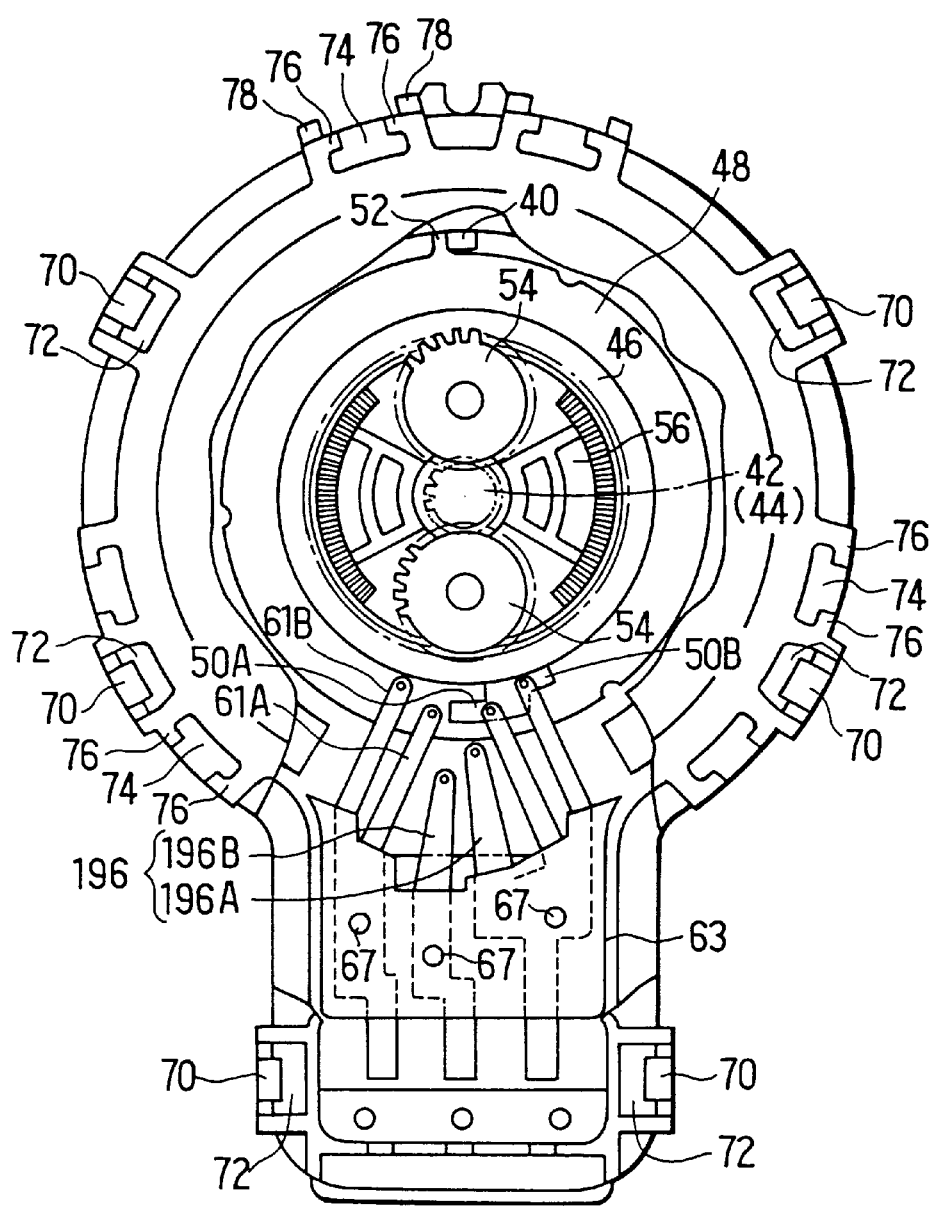
FIG. 4 is a top plan view with parts broken away, showing the position detector of the motor actuator according to the first embodiment.

Around a periphery of the connection shaft 42, a ring gear 46 constituting a part of the planetary gear train unit is disposed to oppose the sun gear 44. The ring gear 46 is rotatably accommodated in the cover plate 36, and a flange portion 48 constituting a first sensor of the position detector 30 is integrally formed with an outer periphery of the ring gear 46. The flange portion 48 formed integrally with the ring gear 46 is a conductive plate and has moving contacts 50A, 50B formed on the surface opposite to the cover plate 36. Each of the moving contacts 50A, 50B is a non-conductive portion formed into an arc shape having two steps, and is formed on the approximately same plane as the flange portion 48. Further, a protruding section 52 is formed on a portion of the periphery of the flange portion 48 to protrude outwardly therefrom. The protruding section 52 corresponds to the above protrusion 40 formed on the cover plate 36, and is so configured that the protruding section 52 makes contact with the protrusion 40 at the time point when the ring gear 46 and the flange portion 48 rotate in the forward direction (i.e., direction indicated by arrow A in FIG. 3) and arrives at a specified rotation position to restrict the ring gear 46 from rotating further in the forward direction. FIG. 4 shows that the protruding section 52 makes contact with the protrusion 40.

In the internal perimeter portion of the ring gear 46, two planetary gears 54 are disposed between the ring gear 46 and the sun gear 44. The planetary gears 54 are rotatably supported by a carrier 56 and engage with both the ring gear 46 and the sun gear 44. That is, the sun gear 44, the ring gear 46 and the planetary gears 54 constitute the planetary gear train unit, which transmits the rotation of the connection shaft 42 (i.e., shaft 20) through speed reduction. For example, when the revolution of the planetary gears 54 is restricted while the carrier 56 is maintained, the rotation of the connection shaft 42 (i.e., shaft 20) can be reduced and is transmitted to the ring gear 46. In the first embodiment, the reduction ratio of the planetary gear train unit composed of the sun gear 44, the ring gear 46 and the planetary gears 54 is set to 5.2:1, and the unit is set so that the ring gear 46 will not make more than one rotation while a window glass moves one stroke, that is, while the sun gear 44 rotates 3 to 3.5 rotations. However, the reduction ratio of the planetary gear train unit is not limited to 5.2:1, but can be set to an arbitrary value as desired.

The planetary gear train unit including the sun gear 44, the ring gear 46 and the planetary gears 54 is covered by the cover plate 36 and is supported by a protective plate 200 to restrict the planetary gear train unit from being separated from the cover plate 36. A spring washer 58 and a washer 59 constituting a clutch mechanism are disposed between the cover plate 36 and the carrier 56. The spring washer 58 is attached integrally to the carrier 56. The washer 59 is press-fitted in the cover plate 36 to integrate with an inner peripheral surface of the cover plate 36, and the spring washer 58 contacts the washer 59 in a pressed state. Thus, the spring washer 58 constantly presses the carrier 56 so that the carrier 56 contacts the protective plate 200. Therefore, normally, the rotation of the carrier 56 is restricted by the pressing force of the spring washer 58 causing the frictional force between the carrier 56 and the protective plate 200, and the planetary gears 54 are supported in such a manner that the revolution of the planetary gears 54 is restricted. on the other hand, when the protruding section 52 of the flange portion 48 of the ring gear 46 makes contact with the protrusion 40 and the further rotation of the ring gear 46 in the forward direction is restricted, the forward direction rotation force of the sun gear 44 surpassing the pressing force (i.e., maintaining force) of the carrier 56 acts. As a result, the spring washer 58 releases the maintenance of the carrier 56 and the planetary gears 54 can perform the revolution. That is, after the protruding section 52 of the flange portion 48 contacts the protrusion 40, the spring washer 58 can interrupt the transmission of the forward direction rotation force from the sun gear 44 (i.e., shaft 20) to the ring gear 46. Thus, when the protruding section 52 contacts the protrusion 40 so that the rotation of the ring gear 46 is restricted, if the sun gear 44 (i.e., shaft 20) starts rotating in the forward direction so that the ring gear 46 rotates in the forward direction, only the planetary gears 54 revolve.

A pair of fixed contacts 60A, 61A and another pair of fixed contacts 60B, 61B as fixed contact terminals are attached onto the cover plate 36. Each pair of the fixed contacts 60A, 61A and the fixed contacts 60B, 61B is a pair of elastic contact terminals. The fixed contact 60A is formed integrally with the fixed contact 60B, and the fixed contact 61A is formed integrally with the fixed contact 61B.

Further, the fixed contacts 60A, 61A and the fixed contacts 60B, 61B are fixed to the cover plate 36 through a fixing portion 63 together with a sliding contact 196, which will be described later. Each top end of the fixed contacts 60A, 61A, 60B, 61B extends toward the flange portion 48 of the ring gear 46 to elastically contact the flange portion 48 on a circular surface opposite to the cover plate 36. That is, the fixed contacts 60A, 61A, 60B, 61B are pressed to the flange portion 48 having the moving contacts 50A, 50B from the side opposite to the cover plate 36.

Figure 5:
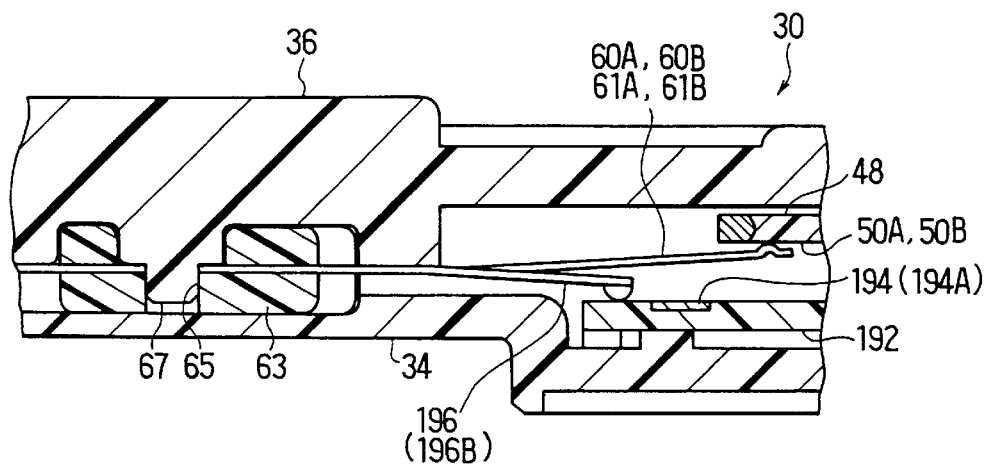
FIG. 5 is an enlarged cross-sectional view showing a pulse plate and a sliding contact of the position detector according to the first embodiment.

The fixed contacts 60A, 61A, 60B, 61B and the sliding contact 196, which will be described later, are insert-formed integrally with the fixing portion 63 to form a fixed contact sub-assembly. As shown in FIG. 5, a protrusion portion 67 formed on the cover plate 36 is fitted into a fitting hole 65 of the fixing portion 36 so that the fixed contacts 60A, 61A, 60B, 61B and the sliding contact 196 are attached to the cover plate 36.

The fixed contacts 60A, 61A, 60B, 61B make contact with the moving contacts 50A, 50B at the specified rotation position of the ring gear 46. The fixed contacts 60A, 61A are positioned to contact the moving contact 50A, and the fixed contacts 60B, 61B are positioned to contact the moving contact 50B.

Further, the fixed contacts 60A, 61A, 60B, 61B are electrically connected to a control circuit of the power window device, and the moving contacts 50A, 50B respectively make contact with the fixed contacts 60A, 60B to be in a non-conductive state. This enables the rotation position of the ring gear 46, that is, the rotation position of the sun gear 44 or the shaft 20 to be detected. The fixed contacts 60A, 61A and the fixed contacts 60B, 61B are used for rotation control of the motor actuator 10, which will be described afterward.

In the first embodiment, it is so designed that, for example, when the window glass reaches a position 4 mm below an upper end stop position of the window glass, the protruding section 52 reaches a rotation position displaced by a specified rotation angle in the forward direction from the rotation position where the protruding section 52 contacts the protrusion 40. At this point, the moving contacts 50A, 50B make contact with the fixed contacts 60A, 60B to become non-conductive. Further, this non-conductive state is maintained until the protruding section 52 contacts the protrusion 40.

Alternatively, it may be so designed that when the window glass reaches a position 4 mm below the upper end stop position of the window glass and the protruding section 52 reaches a rotation position displaced by a specified rotation angle in the forward direction from the rotation position where the protruding section 52 contacts the protrusion 40, the moving contacts 50A, 50B make contact with the fixed contacts 60A, 61A and the fixed contacts 60B, 61B to become conductive, thereby performing the position detection. Once the moving contacts 50A, 50B become conductive or non-conductive as described above, it is not always necessary to electrically maintain such conductive state or non-conductive state. By detecting a trigger signal generated from the contact between the moving contacts 50A, 50B and the fixed contacts 60A, 61A, 60B, 61B, it can be determined that the protruding section 52 reaches a specified rotation position.

Figure 6A:
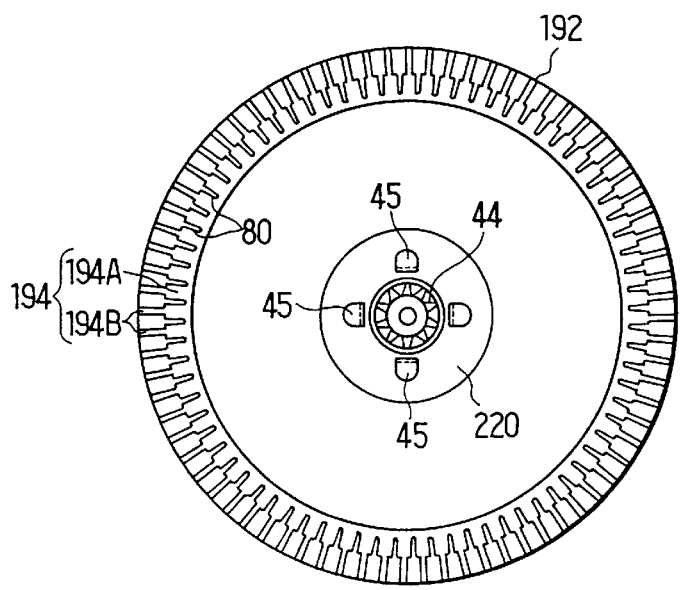
FIG. 6A is a top plan view showing the pulse plate and a connecting shaft of the position detector according to the first embodiment.
Figure 6B:
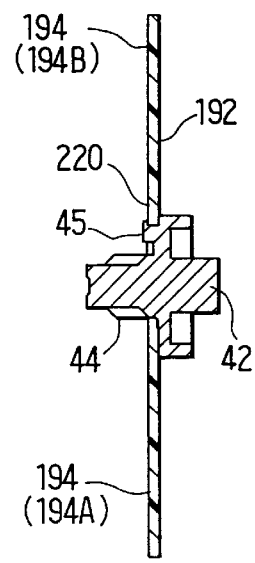
FIG. 6B is a cross-sectional view showing the pulse plate and the connecting shaft of the position detector according to the first embodiment.

The position detector 30 has the pulse plate 192 and the sliding contact 196, which constitute second sensor of the position detector 30. The pulse plate 192 is formed into a thin circular plate made of resin, and the fitting hole 198 is formed at a center portion of the pulse plate 192. The fitting hole 198 is formed to be cross-shaped to correspond to both the connection shaft 42 and the protrusion portions 45 formed on the connection shaft 42, so that the connection shaft 42 and the protrusion portions 45 are inserted into the fitting hole 198. Further, the washer 220 is disposed to be opposite to the connection shaft 42 with respect to the pulse plate 192, and the pulse plate 192 is supported by the washer 220 and the connection shaft 42. A through hole 222 corresponding to the sun gear 44 and connection holes 224 corresponding to the protrusion portions 45 of the connection shaft 42 are formed in the washer 220, and the sun gear 44 and the protrusion portions 45 are inserted into the through hole 222 and the connection holes 224, respectively. That is, as shown in FIGS. 6A, 6B, the protrusion portions 45 of the connection shaft 42 having the sun gear 44 are inserted into the fitting hole 198 of the pulse plate 192 and further inserted into the connection holes 224 of the washer 220 so that each top end of the protrusion portions 45 is fastened to the washer 220. Therefore, the pulse plate 192 is integrally connected to the connection shaft 42 and the sun gear 44, and thereby the pulse plate 192 is constantly rotated integrally with the connection shaft 42.

Figure 7A:
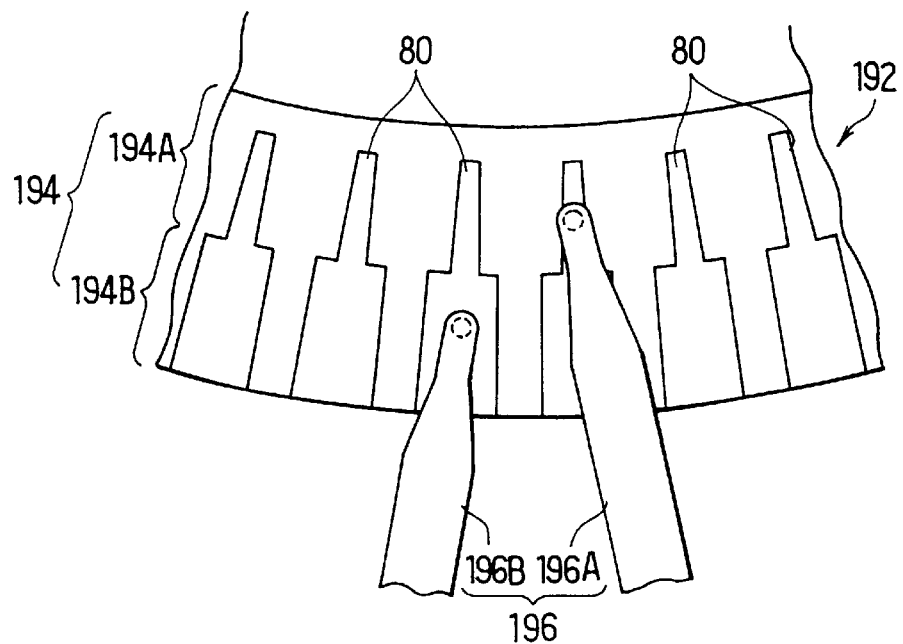
FIG. 7A is an enlarged top plan view showing the pulse plate and the sliding contact of the position detector according to the first embodiment.
Figure 7B:
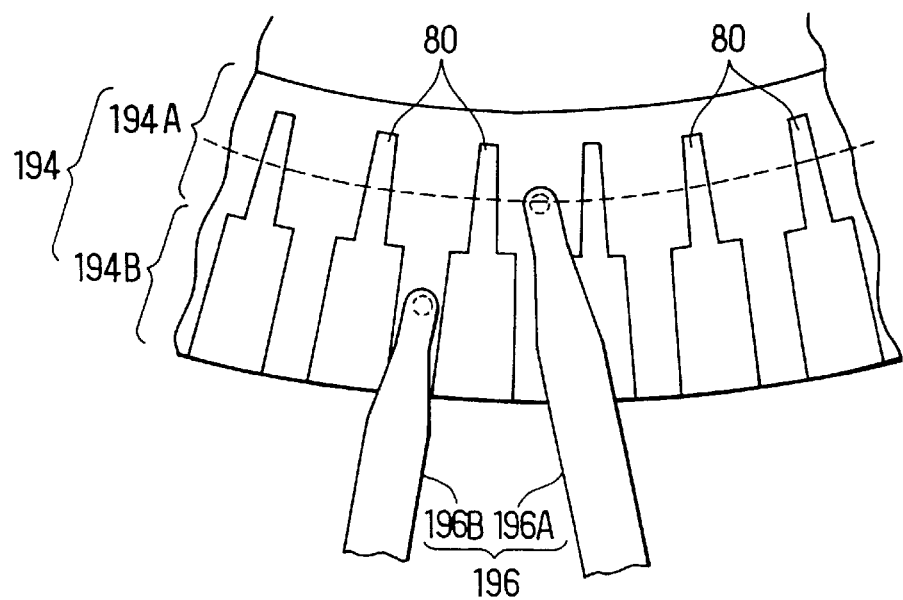
FIG. 7B is an enlarged top plan view showing the pulse plate and the sliding contact of the position detector at a timing different from that in FIG. 7A, according to the first embodiment.

Further, a conductive unit 194 is formed on the pulse plate 192. As shown in FIGS. 6A, 7A, 7B, the conductive unit 194 is formed in the periphery of the pulse plate 192 along the perimeter direction, and includes a ring-shaped first conductive unit 194A and a second conductive unit 194B which is adjacent to the first conductive unit 194A. The conductive unit 194 is formed by plating metal material such as nickel on a resin plate. The second conductive unit 194B has a sequential pulse-shaped uneven surface made of a conductive portion and a non-conductive portion. The conductive portion made of metal is formed to be higher than the non-conductive portion made of resin.

Further, as shown in FIGS. 7A, 7B, the first conductive unit 194A has a plurality of slit portions 80, which are formed by slitting the first conductive unit 194A to expose the resin material of the pulse plate 192; that is, the slit portions 80 are not plated with conductive metal material. The slit portions 80 are disposed along the entire periphery of the first conductive unit 194A in such a manner that each of the slit portions 80 corresponds to each of the non-conductive portions of the second conductive unit 194B. Further, each of the slit portions 80 is disposed to be on a path of a contact portion of the input contact 196A, indicated by a broken line in FIG. 7B. Grease tends to be collected in a boundary portion of each of the slit portions 80 due to the height difference (difference in thickness of pulse plate 192) between the slit portions 80 and a conductive portion of the first conductive unit 194A. Thus, each of the slit portions 80 functions as a grease collector.

The sliding contact 196 has an input contact 196A and an output contact 196B, both being made of copper, for example. The sliding contact 196 and the fixed contacts 60A, 61A, 60B, 61B are integrally insert-formed into the fixing portion 63 to be fixed to the cover plate 36, and extend toward the conductive unit 194 of the pulse plate 192. The input contact 196A constantly makes contact with the first conductive unit 194A of the conductive unit 194, and the output contact 196B makes contact with the second conductive unit 194B of the conductive unit 194. Thus, the pulse signal can be detected as the pulse plate 192 rotates. The detected pulse signal is used for a moving position control of a moving body (window glass).

Further, the input contact 196A which makes contact with the first conductive unit 194A also makes contact with the slit portions 80 as the pulse plate 192 rotates because the first conductive unit 194A of the pulse plate 192 has the slit portions 80. The slit portions 80 are disposed in such a manner that the input contact 196A does not make contact with the slit portions 80 at least when the output contact 196B makes contact with the conductive portion of the second conductive unit 194B. That is, as shown in FIG. 7B, the input contact 196A makes contact with a conductive portion of the first conductive unit 194A whenever the output contact 196B makes contact with the conductive portion of the second conductive unit 194B. Further, in the first embodiment, the slit portions 80 are formed in such a manner that each of the slit portions 80 extends from each of the non-conductive portion of the second conductive unit 194B, and has a width smaller than that of the non-conductive portion of the second conductive unit 194B.

Figure 8:
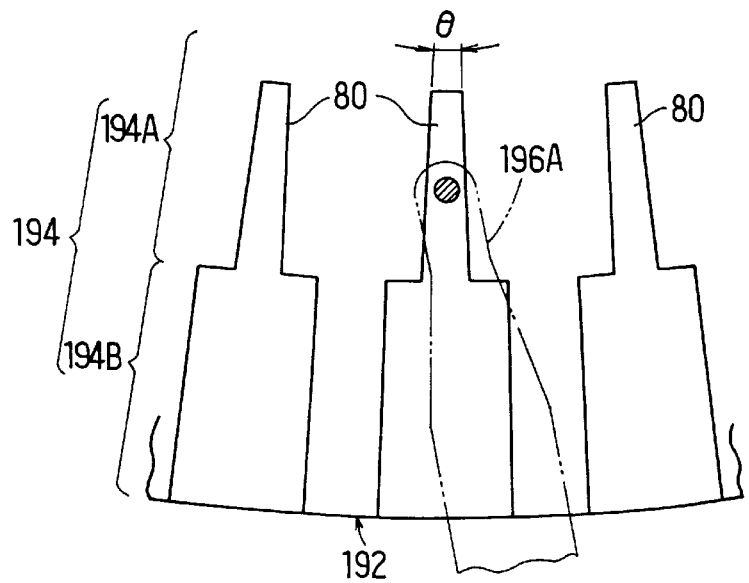
FIG. 8 is an enlarged top plan view showing the pulse plate of the position detector according to the first embodiment.
Figure 9A:
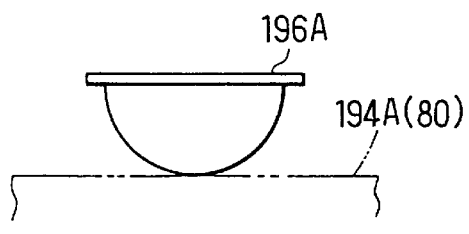
FIG. 9A is a front view showing the non-abraded sliding contact of the position detector according to the first embodiment.
Figure 9B:
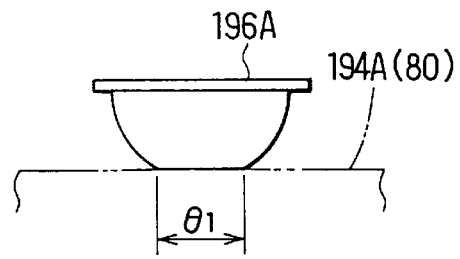
FIG. 9B is a front view showing the abraded sliding contact of the position detector according to the first embodiment.
Figure 10:
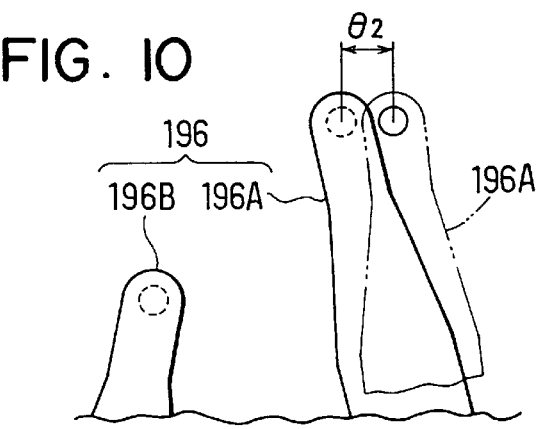
FIG. 10 is an enlarged top plan view showing a deviation from a right position of the sliding contact of the position detector according to the first embodiment.

Furthermore, referring to FIGS. 8–10, a width $\theta$ of each of the slit portions 80 is determined according to a maximum permissible width $\theta_1$ of a contact surface of the input contact 196A created by a maximum permissible abrasion, and a position deviation $\theta_2$ of the input contact 196A caused by a size unevenness of parts of the sliding contact 196. As shown in FIG. 9A, the input contact 196A is initially not abraded and makes contact with the first conductive unit 194A. However, the input contact 196A is gradually abraded as being used, and eventually, becomes to have a contact surface width, as shown in FIG. 9B. Therefore, the width $\theta$ of each of the slit portions 80 is set to a value larger than the maximum permissible width $\theta_1$ of the contact surface of the abraded input contact 196A. Further, the input contact 196A has the position deviation $\theta_2$ due to a size unevenness of its parts, as shown in FIG. 10. Therefore, the width $\theta$ of each of the slit portions 80 is set to a value smaller than the position deviation $\theta_2$. That is, the width $\theta$ of each of the slit portions 80 is set to be larger than the maximum permissible width $\theta_1$ and smaller than the position deviation $\theta_2$ (i.e., $\theta_1 < \theta < \theta_2$).

The conductive unit 194 may be formed on the side wall of the periphery of the pulse plate 192 instead of the upper surface thereof. In this case, the sliding contact 196 is secured to the cover plate 36 to oppose the side peripheral wall of the pulse plate 192.

Further, the protective plate 200 is disposed between the pulse plate 192 and the ring gear 46 (flange portion 48). The periphery of the protective plate 200 is secured to and supported by the cover plate 36, and supports parts such as the ring gear 46 and the carrier 56 to restrict these parts from being separated from the cover plate 36. Further, the protective plate 200 intervenes between the pulse plate 192 and the ring gear 46, thereby limiting the movements of the pulse plate 192 and the ring gear 46 to restrict the two parts from making contact with each other.

Referring back to FIG. 3, the base plate 34 and the cover plate 36 are integrally connected with each other to form a substantially cylindrical shape having a thin wall for accommodating the above parts. A plurality of fitting teeth 70 formed to protrude from the periphery of the base plate 34 are fitted into corresponding tooth holders 72 formed in the cover plate 36 so that the base plate 34 and the cover plate 36 are connected with each other.

Further, a plurality of fitting portions 74 are formed on the periphery of the cover plate 36. The fitting portions 74 correspond to the clamping portions 28 of the housing 24, and each of the T-shaped leading edges of the clamping portions 28 is inserted into each of the fitting portions 74. That is, each of the T-shaped leading edges of the clamping portions 28 is fitted into each of the fitting portions 74 by fastening the clamping portions 28. As a result, the periphery of the cover plate 36 is supported and the position detector 30 is secured to a predetermined position on the housing 24.

Further, each of the fitting portions 74 has a latching protrusion 76. The latching protrusion 76 can fit with the T-shaped leading edge of the clamping portion 28 when the position detector 30 (cover plate 36) is secured by the clamping portion 28. The latching protrusion 76 restricts the clamping portion 28 from moving outwardly in a radial direction from the periphery of the cover plate 36.

Furthermore, a guiding protrusion 78 is provided on the peripheral wall of the cover plate 36 in the vicinity of the latching protrusion 76. The guiding protrusion 78 can fit with a middle portion of the clamping portion 28 when the position detector 30 (cover plate 36) is secured by the clamping portion 28. The guiding protrusion 78 restricts the clamping portion 28 from moving along the periphery of the cover plate 36.

Figure 11:
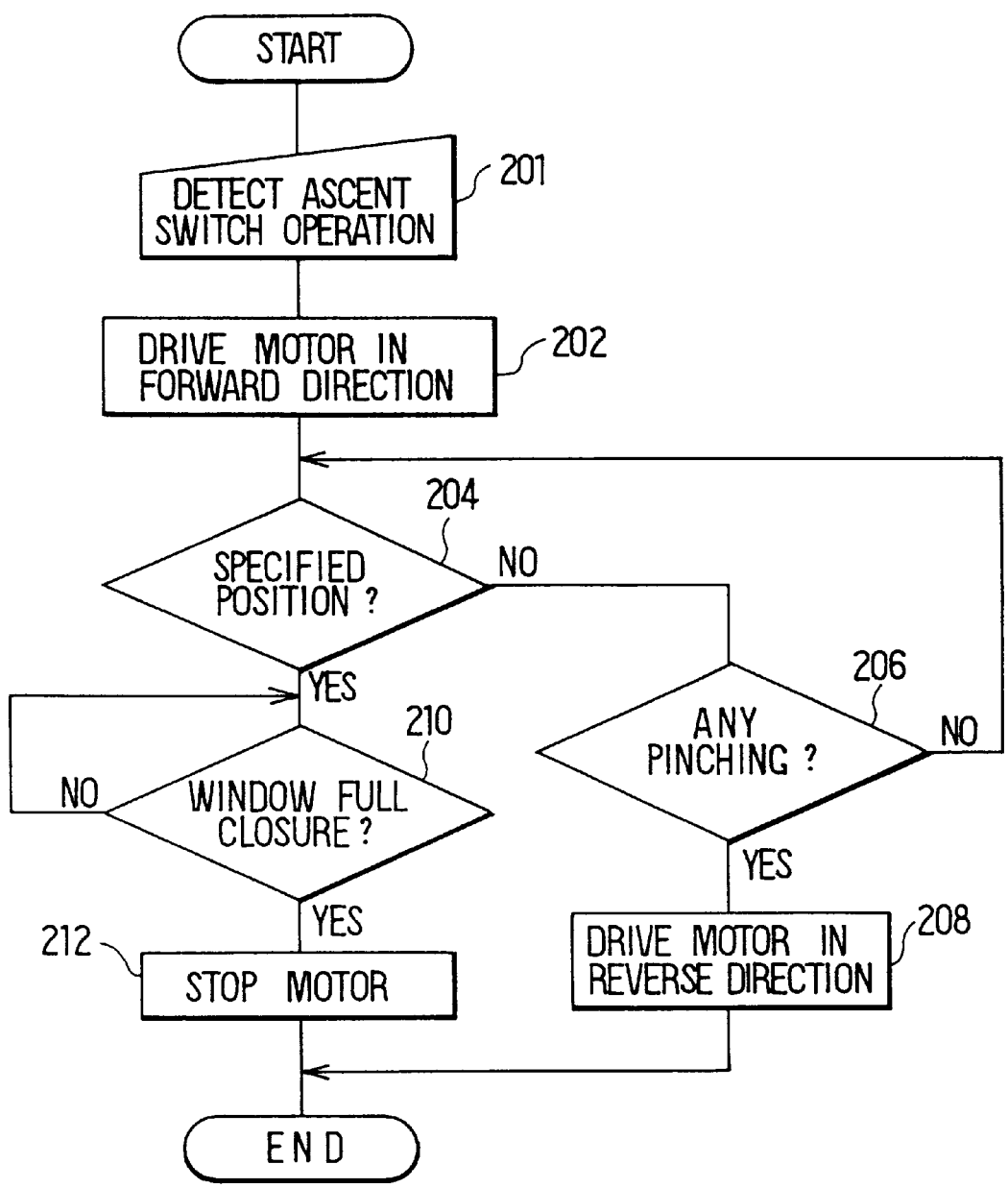
FIG. 11 is a flow chart showing an ascent control routine for a vehicle window glass according to the first embodiment.

Next, an operation of the present embodiment is described with reference to the flow chart shown in FIG. 11, for a case in which the window glass moves upwardly in response to the operation of an ascent switch of the power window device.

In the above motor actuator 10, when the ascent switch of the power window device is operated at step 201, the motor actuator 10 is driven to rotate the shaft 20 at step 202 so that the window regulator is actuated and the window glass is raised.

While the window glass is ascending, the carrier 56 is normally pressed and supported by the spring washer 58 so that the revolution of the planetary gears 54 is stopped. Therefore, as the shaft 20 rotates, the rotation force of the connection shaft 42 (i.e., sun gear 44) is reduced through the planetary gears 54 and is transmitted to the ring gear 46. As a result, the ring gear 46 gradually starts rotating in the forward direction.

Next, at step 204, whether or not the motor actuator 10 has reached a specified rotation position, that is, whether or not the window glass has reached a specified position is detected by the position detector 30. In the first embodiment, the specified position is set to the position 4 mm below an upper end stop position of the window glass.

That is, in the position detector 30, with the rotation of the shaft 20, the rotation force of the connection shaft 42 (i.e., sun gear 44) is reduced through the planetary gears 54 and transmitted to the ring gear 46, so that the ring gear 46 gradually starts rotating in the forward direction. However, if the window glass does not reach the position 4 mm below the upper end stop position, the protruding section 52 is greatly separated from the protrusion 40, resulting in that the moving contacts 50A, 50B do not make contact with the fixed contacts 60A, 61A, 60B, 61B. Thus, the rotation position of the shaft 20 is detected to determine that the window glass does not reach the position 4 mm below the upper end stop position. In this case, with the motor actuator 10 being actuated, the control process moves to step 206, and it is detected whether or not any foreign article is pinched between the window glass and the window frame based on the lock current of the motor actuator 10 or the like. When it is detected that something is pinched, the motor actuator 10 is rotated in the reverse direction at step 208, so that the window glass descends. On the other hand, when it is determined that nothing is pinched at step 206, the control process returns to step 204.

When the window glass reaches the position 4 mm below the upper end stop position at step 204, the protruding section 52 reaches a rotation position displaced by a specified rotation angle in the forward direction from the rotation position where the protruding section 52 contacts the protrusion 40. Further, at this point, the moving contacts 50A, 50B make contact with the fixed contacts 60A, 60B to be in a non-conductive state, and thus the rotation position of the shaft 20 is detected to determine that the window glass reaches the position 4 mm below the upper end stop position.

When it is detected at step 204 that the shaft 20 of the motor actuator 10 has reached a predetermined rotation position, that is, that the window glass has reached a predetermined position, the control process proceeds to step 210 while the motor actuator 10 is continuously operated. At this point, the non-conductive state of the moving contacts 50A, 50B is maintained although each of the relative contact positions between the moving contacts 50A, 50B and the fixed contacts 60A, 60B, 61A, 61B is changed due to the rotation of the ring gear 46.

At step 210, it is determined whether or not the window glass is fully closed according to the lock current or the like of the motor actuator 10. When the full closure of the window glass is detected, the motor actuator 10 is stopped at step 212 and the control process is completed.

Thus, in the motor actuator 10 having the position detector 30, by using the moving contacts 50A, 50B rotating together with the ring gear 46 and each pair of the fixed contacts 60A, 61A and fixed contacts 60B, 61B, the rotation position of the shaft 20 can be accurately detected; that is, it is accurately detected whether or not the window glass reaches the position 4 mm below the upper end stop position.

Further, the motor actuator 10 can be automatically set to its initial state in which the moving contacts 50A, 50B of the position detector 30 make contact with the fixed contacts 60A, 60B, by sufficiently rotating the shaft 20 of the motor actuator 10 in the forward direction after installing the motor actuator 10 in the vehicle. That is, when the shaft 20 of the motor actuator 10 is sufficiently rotated in the forward direction after installing the motor actuator 10 in the vehicle, the protruding section 52 of the flange portion 48 of the ring gear 46 contacts the protrusion 40, thereby restricting the ring gear 46 from rotating further in the forward direction. When the shaft 20 further rotates under this condition, the rotation force of the sun gear 44 surpassing the pressing force (holding force) of the carrier 58 acts, and the spring washer 58 cancels the holding of the carrier 56 so that the revolution of the planetary gears 54 can be performed. That is, the spring washer 58 can shut off the transmission of the rotation force in the forward direction from the sun gear 44 (shaft 20) to the ring gear 46 after the protruding section 52 of the flange portion 48 contacts the protrusion 40. Therefore, when the sun gear 44 (shaft 20) rotates in the forward direction, in which the ring gear 46 is to rotate in the forward direction, while the rotation of the ring gear 46 is stopped due to the contact between the protruding section 52 and the protrusion 40, only the planetary gears 54 revolves. Accordingly, after the protruding section 52 contacts the protrusion 40 and the moving contacts 50A, 50B make contact with the fixed contacts 60A, 60B, the ring gear 46 does not move even if the shaft 20 of the motor actuator 10 rotates in the forward direction, and the contact state between the moving contacts 50A, 50B and the fixed contacts 60A, 60B is maintained. Thus, by once sufficiently rotating the shaft 20 of the motor actuator 10 in the forward direction, the motor actuator 10 is automatically set to its initial state in which the protruding section 52 contacts the protrusion 40 and the moving contacts 50A, 50B make contact with the fixed contacts 60A, 60B.

That is, the motor actuator 10 having the position detector 30 can mechanically memorize a position a preset length away from a fully closing position (i.e., a maximum ascent position) of the window glass, regardless of whether or not the window glass has reached the fully closing position. In the first embodiment, the above position is set to be 4 mm away from the fully closing position. That is, in the motor actuator 10, position detection is performed based on the above position 4 mm away from the fully closing position. Therefore, the movement control of the window glass can be accurately performed.

A conventional position detector which detects the moving position of a window glass by detecting the number of revolution of an armature of a motor is reset based on the fully closing position of the window glass, for example. However, if the window glass stops its movement for some reason before reaching the maximum ascent position due to a reduced voltage or an increased friction between the window glass and the window frame, the position detector is reset with this erroneous stop position as the full closing position of the window glass. In this case, a great error may occur because the driving control of the motor is performed based on the erroneous stop position of the window glass. On the other hand, in the motor actuator 10, even if the window glass stops its movement before reaching the fully closing position, it is accurately detected that the window glass passes the position 4 mm away from the fully closing position. Therefore, the movement of the window glass is accurately controlled. Especially, in a wire-type window regulator apparatus, error in moving position control may be large due to slack of wire. However, by using the motor actuator 10, the error in moving position control due to slack of wire can be restricted, leading to an accurate moving position control of the wire-type window regulator apparatus.

Thus, by once sufficiently rotating the shaft 20 of the motor actuator 10 in the forward direction after installment of the motor actuator 10 in the vehicle, the motor actuator 10 is automatically set to the initial state in which the protruding section 52 contacts the protrusion 45 and the moving contacts 50A, 50B contact the fixed contacts 60A, 60B. Thus, the initial state of the motor actuator 10 can be readily set without cumbersome positional adjustment during installment and the cumbersome resetting after installment, and further, the moving control of the window glass can be accurately performed without error.

Further, in the motor actuator 10 according to the present embodiment, as the pulse plate 192 rotates, the output contact 196B repeats making contact with and separating from the second conductive unit 194B of the conductive unit 194 so that the pulse signal is detected. Therefore, the rotation position of the shaft 20 of the motor actuator 10 can be linearly detected based on the detected pulse signal. Therefore, when the position detector 30 is used for the power window device for a vehicle having a pinching restriction function, the moving position of the window glass can be constantly detected and linearly controlled.

Further, in the motor actuator 10, the pulse plate 192 made of resin of the position detector 30 has the first conductive unit 194A made of metal, and the slit portions 80 are formed on the first conductive unit 194A by exposing the resin material so that grease is collected in the slit portions 80. Thus, when the pulse plate 192 rotates and the input contact 196A of the sliding contact 196 slides on the first conductive unit 194A of the pulse plate 192, a part of the input contact 196A sequentially makes contact with (slides on) the slit portions 80. Grease tends to be collected in a boundary portion of each of the slit portions 80 due to the height difference between the slit portions 80 and the conductive portion of the first conductive unit 194A so that each of the slit portions 80 functions as a grease collector. Therefore, when the pulse plate 192 rotates and the input contact 196A slides on the first conductive unit 194A, grease is sufficiently supplied therebetween due to the contact between the input contact 196A and the slit portions 80. As a result, even if the first conductive unit 194A made of metal continuously makes contact with the input contact 196A which is also made of metal, grease does not run out therebetween. Thus, the first conductive unit 194A and the input contact 196A do not fuse at a high temperature, and the position detector 30 can maintain the original position detection performance.

Further, each of the slit portions 80 is formed to have a width smaller than a width of the non-conductive portion of the second conductive unit 194B, and it is set so that the input contact 196A assuredly makes contact with the conductive portion of the first conductive unit 194A (i.e., portion other than slit portions 80), at least when the output contact 196A makes contact with the conductive portion of the second conductive unit 194B. Therefore, a cycle and a duty ratio of the pulse signal depend on solely the widths of the conductive and non-conductive portions of the second conductive unit 194B. As a result, manufacturing and size control of the parts are simplified and a desired pulse signal is readily obtained. Further, any further control based on the pulse signal is also readily performed with a great efficiency.

Thus, the motor actuator 10 according to the first embodiment restricts grease run-out between the pulse plate 192 and the sliding contact 196 to restrict these parts from fusing at a high temperature, while maintaining its original position detection performance. As a result, the motor actuator 10 can constantly detect a moving position of a moving body with a great accuracy.

In the first embodiment, each of the slit portions 80 is disposed along the entire periphery of the first conductive unit 194A to correspond to each of the non-conductive portions of the second conductive unit 194B. However, the slit portion 80 may be disposed on at least one point in the first conductive unit 194A which corresponds to at least one point of the non-conductive portion of the second conductive unit 194B. In this case, the same effect as in the first embodiment can also be obtained.

(Second Embodiment)

Figure 12:
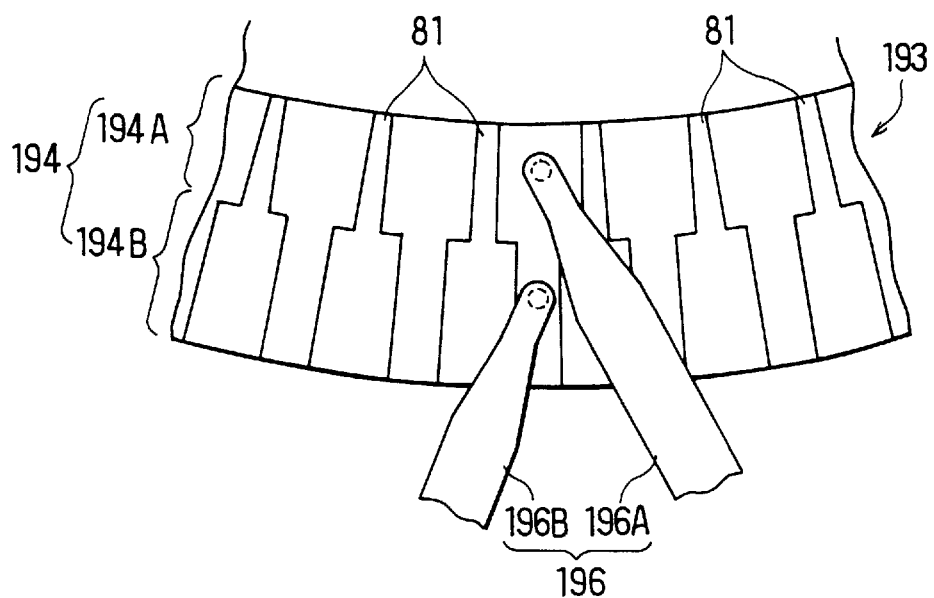
FIG. 12 is an enlarged top plan view showing a pulse plate and a sliding contact of a position detector of a motor actuator according to a second embodiment of the present invention.
Figure 13:
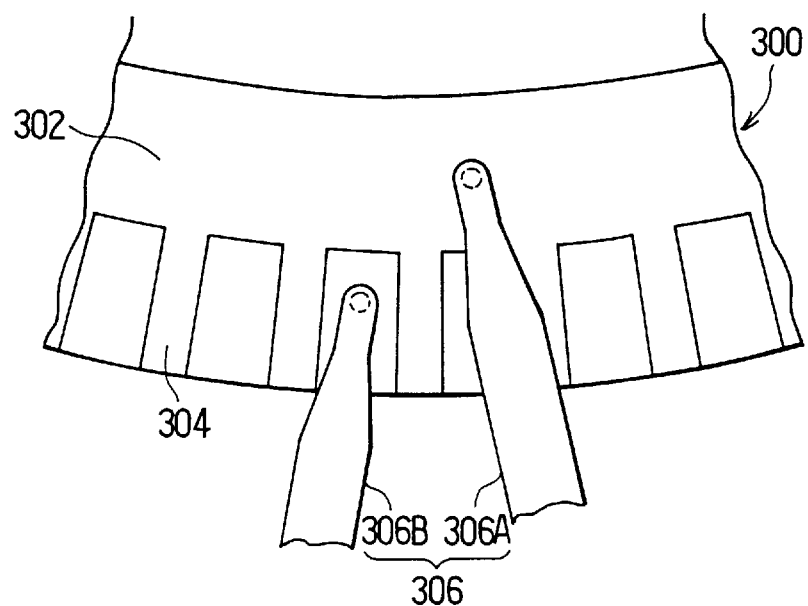
FIG. 13 is an enlarged top plan view showing a pulse plate and a sliding contact of a conventional position detector.

In the first embodiment, the slit portions 80 are continuously formed along the periphery of the first conductive unit 194A on a partial area of the first conductive unit 194A in the radial direction. However, in a second embodiment, as shown in FIG. 12, in a pulse plate 193, slit portions 81 may be formed over an entire area or an entire width of the first conductive unit 194A in the radial direction so that the first conductive unit 194A is separated into pieces along the circumferential direction. That is, in the second embodiment, the first conductive unit 194A does not continue along the entire periphery of the first conductive unit 194A. In this case, it is set so that the input contact 196A makes contact with the conductive portion of the first conductive unit 194A extending from the conductive portion of the second conductive unit 194B (i.e., portion other than slit portions 81), whenever the output contact 196B makes contact with the conductive portion of the second conductive unit 194B.

In the above first and second embodiments, the motor actuator 10 is used as a driving motor for the power window device. However, the present invention is not limited to this application, but can be applied for detecting and controlling a moving position of a moving body which moves back and forth linearly. For example, the present invention can also be applied for detecting and controlling a moving position of a sun roof which moves on a guide rail.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A motor actuator comprising:

a motor having an output shaft; and a sensor coupled to said output shaft and capable of generating a pulse signal to detect a rotation position of said output shaft, wherein:

said sensor comprises;

at least a pair of sliding contacts for generating said pulse signal;

a pulse plate having a first conductive unit having a first conductive portion and a first non-conductive portion located on a path where one of said sliding contacts slides on, the first non-conductive portion having a first width in a sliding direction, and a second conductive unit electrically connected to said first conductive unit, having a sequential uneven surface made of a second conductive portion and a second non-conductive portion, the second non-conductive portion having a second width in the sliding direction, where the other one of said sliding contacts slides on, and wherein the second width is greater than the first width.

2. A motor actuator according to claim 1, wherein:

said sliding contacts include a first sliding contact which slides on said first conductive unit and a second sliding contact which slides on said second conductive unit; and said first conductive unit and said second conductive unit are arranged so that said first sliding contact makes contact with said first conductive portion of said first conductive unit when said second sliding contact makes contact with said second conductive portion of said second conductive unit.

3. A motor actuator according to claim 1, wherein:

said first non-conductive portion extends integrally from said second non-conductive portion.

4. A motor actuator according to claim 1, wherein:

said first conductive unit has a step at a boundary portion between said first conductive portion and said first non-conductive portion so that grease is collected at said step in said boundary portion of said first non-conductive portion.

5. A motor actuator according to claim 1, wherein:

said second conductive unit has a step at a boundary portion between said second conductive portion and said second non-conductive portion.

6. A motor actuator according to claim 1, wherein:

said pulse plate is made of resin;

said first and second conductive units have conductive metal plated on said pulse plate; and said first non-conductive portion is an exposure of said resin of said pulse plate.

7. A motor actuator according to claim 6, wherein:

said plating metal is nickel.

8. A motor actuator according to claim 1, wherein:

said first non-conductive portion is formed at a plurality of locations along an entire circumference of said pulse plate.

9. A motor actuator comprising:

a motor having an output shaft; and a sensor coupled to said output shaft and capable of generating a pulse signal to detect a rotation position of said output shaft, wherein:

said sensor has a resin pulse plate having a first conductive unit made of metal and adjacent to said first conductive unit, and a pair of metal sliding contact which make contact with said pulse plate, for generating a pulse signal as said pulse plate rotates;

said first conductive unit has a slit portion in which grease is collected, said slit portion being an exposure of said resin of said pulse plate and capable of making contact with said sliding contacts; and said second conductive unit has a sequential uneven surface made of a conductive portion and a non-conductive portion, wherein said sliding contacts include an input contact which makes contact with said first conductive unit and an output contact which makes contact with said second conductive unit; and said slit portion extends integrally from said non-conductive portion of said second conductive unit and has a width smaller than that of said non-conductive portion of said second conductive unit in such a manner that said input contact makes contact with said first conductive unit other than said slit portion when said output contact makes contact with said conductive portion of said second conductive unit.

* * * * *